US005582676A

United States Patent [19]

Otsuka

[11] Patent Number: 5,582,676

[45] Date of Patent: Dec. 10, 1996

[54] APPARATUS FOR APPLYING ADHESIVE ONTO SCARF-CUT FACE OF VENEER

[75] Inventor: Toshiyuki Otsuka, Nagoya, Japan

[73] Assignee: Meinan Machinery Works, Inc., Ohbu, Japan

[21] Appl. No.: 327,422

[22] Filed: Oct. 21, 1994

[30] Foreign Application Priority Data

Oct. 27, 1993 [JP] Japan .................................. 5-291423

[51] Int. Cl.[6] ................................................ B32B 31/00

[52] U.S. Cl. ......................... 156/357; 156/363; 156/364; 156/578; 118/241; 118/243; 118/669; 118/678; 118/687

[58] Field of Search .................................. 156/356, 357, 156/362, 363, 364, 366, 578; 118/240, 241, 242, 243, 668, 669, 676, 677, 678, 680, 681, 682, 686, 687

[56] References Cited

U.S. PATENT DOCUMENTS

| | | | |
|---|---|---|---|
| 2,317,446 | 4/1943 | Dennis | 156/357 |
| 2,644,496 | 7/1953 | Schubert | 156/357 |
| 3,025,830 | 3/1962 | Vierthaler et al. | 118/243 |
| 4,042,440 | 8/1977 | Hasegawa et al. | 156/357 X |
| 4,243,465 | 1/1981 | Gozzi | 156/362 |
| 4,530,306 | 7/1985 | Hovekamp | 118/669 |

FOREIGN PATENT DOCUMENTS

| | | | |
|---|---|---|---|
| 1957676 | 5/1971 | Germany | 156/357 |
| 56-10165 | 3/1981 | Japan . | |
| 5-25841 | 6/1993 | Japan . | |

*Primary Examiner*—David A. Simmons
*Assistant Examiner*—Paul M. Rivard
*Attorney, Agent, or Firm*—Lahive & Cockfield

[57] ABSTRACT

The invention provides a simply-constructed apparatus for applying a substantially fixed amount of adhesive onto a scarf-cut face of a veneer. The apparatus includes: a plurality of rolls (2,4,48,50) for successively feeding veneers in a predetermined feeding direction along fibers of the veneers; a plurality of detectors (6) for detecting existence of a veneer; an adhesive reservoir (40) having a length, in a direction perpendicular to the feeding direction, equal to or greater than the width of the veneers; an adhesive application member (24) having a length, in the direction perpendicular to the feeding direction, equal to or greater than the width of the veneers; and a plurality of pivot mechanisms (26) and lifting members (28) for reciprocating the adhesive application member (24) between a first position and a second position. At the first position, the adhesive application member (24) is inserted into the adhesive reservoir (40) to take a substantially fixed amount of adhesive on adhesive-applying faces (**24*a*, 24*b*) of the adhesive application member (24). At the second position, the adhesive-applying faces (24*a*, 24*b*) of the adhesive application member (24) is pressed in a substantially parallel configuration against a scarf-cut face of the veneer to apply the substantially fixed amount of adhesive on the adhesive-applying faces (24*a*, 24*b***) to the scarf-cut face of the veneer.

13 Claims, 11 Drawing Sheets

Prior Art

APPARATUS FOR APPLYING ADHESIVE ONTO SCARF-CUT FACE OF VENEER

BACKGROUND OF THE INVENTION

1. Field of the Invention

The present invention relates to an apparatus for applying an adhesive onto veneers having an obliquely-cut face for scarf joint (hereinafter referred to as scarf-cut face).

2. Description of the Related Art

One example of conventional apparatus for applying an adhesive on a scarf-cut face of a pre-worked veneer as shown in FIG. 1 is disclosed in JAPANESE UTILITY MODEL LAYING-OPEN GAZETTE No. H-1-13,301. In this conventional structure, an adhesive stored in an adhesive reservoir is fed to a supply valve unit 131 by a pressure-feed pump. The adhesive is supplied from the supply valve unit 131 onto a belt 129 spanning in a direction perpendicular to a veneer-feeding direction while the belt 129 goes half round to make a line of adhesive 141 adhere to the belt 129. The line of adhesive 141 is taken up onto a scarf-cut face 105*a* of a veneer and then spread over the whole scarf-cut face 105*a* by a rolling belt 155.

The conventional adhesive-applying apparatus constructed as above has drawbacks described below. The pressure-feed pump has upper-limit and lower-limit pressures preset for ensuring safe and smooth operations of the pump, and is controlled to work in a pressure range between the upper limit and the lower limit. The pressure applied during operation of the pressure pump is accordingly varied in the pressure range between the upper limit and the lower limit. This results in variation in the amount of adhesive supplied from the supply valve unit 131. The amount of adhesive supplied from the supply valve unit 131 is also varied with the viscosity of the adhesive. The conventional apparatus requires a relatively complicated mechanism to realize the adhesive taken-up process and the spread-out process.

SUMMARY OF THE INVENTION

One object of the invention is to provide a novel apparatus for applying a substantially fixed amount of adhesive onto a scarf-cut face of a veneer.

Another object of the invention is to provide an adhesive-applying apparatus having a simple structure.

The invention is directed to an apparatus for applying an adhesive onto a veneer having at least one obliquely-cut face for scarf joint or a scarf-cut face. The apparatus includes:

- feeding means having an intermittent driving mechanism for feeding and transporting a veneer in a predetermined feeding direction along fibers of the veneer and stopping to hold the veneer at a predetermined holding position, the feeding means forming a transportation path along which veneers are fed and transported;
- detector means for detecting the veneer transported by the intermittent driving mechanism of the feeding means and outputting a detection signal when existence of the veneer is detected;
- adhesive reservoir means disposed at a position downstream the detector means in the predetermined feeding direction and apart from the transportation path for storing an adhesive;
- adhesive application means disposed at a position downstream the detector means in the predetermined feeding direction and having an adhesive-applying surface for applying the adhesive onto a scarf-cut face of the veneer transported and held at the predetermined holding position by the intermittent driving mechanism of the feeding means;
- reciprocating means mounted on the adhesive application means for reciprocating the adhesive application means between a first position where the adhesive application means is inserted into the adhesive reservoir means to take the adhesive on the adhesive-applying surface thereof and a second position where the adhesive-applying surface of the adhesive application means is pressed in a substantially parallel configuration against the scarf-cut face of the veneer to apply the adhesive on the adhesive-applying surface to the scarf-cut face of the veneer, which is held at the predetermined holding position by the intermittent driving mechanism of the feeding means; and
- control means for receiving the detection signal output from the detector means, determining a position of the veneer, and controlling operations of the intermittent driving mechanism of the feeding means and the reciprocating means based on the position of the veneer.

In the apparatus thus constructed, the adhesive reservoir means having an open top is further provided with freely-adjustable space regulator means mounted on the open top of the adhesive reservoir means to define a space through which the adhesive application means is inserted in and pulled out of the adhesive reservoir means, so that a substantially fixed amount of adhesive is taken on the adhesive-applying surface of the adhesive application means. The adhesive application means is, for example, an L-shaped or a T-shaped plate.

According to one preferable application, the space regulator means includes a freely-adjustable space regulator plate having a reverse truncated cone-shaped opening to define an area of the space through which the adhesive application means is inserted in and pulled out of the adhesive reservoir means, so as to allow a substantially fixed amount of adhesive to be applied onto the adhesive-applying surface of the adhesive application means.

According to another preferable application, the adhesive reservoir means has an inclined face and the space regulator means has a space regulator roll and a larger-diametral ring mounted on a circumference of the space regulator roll. While the larger-diametral ring rolls over the inclined face of the adhesive reservoir means to come into contact with the adhesive application means, the space regulator roll is held apart from the adhesive application means by a fixed distance, so as to allow a substantially fixed amount of adhesive to be applied onto the adhesive-applying surface of the adhesive application means.

In one typical application, an adhesive-applying apparatus includes:

- feeding means having an intermittent driving mechanism for successively feeding and transporting a first veneer and a second veneer in a predetermined feeding direction along fibers of the veneers wherein the first veneer has at least a rear scarf-cut face and the second veneer has at least a front scarf-cut face, the intermittent driving mechanism being inactivated to hold the rear scarf-cut face of the first veneer at a first holding position and the front scarf-cut face of the second veneer at a second holding position, the feeding means forming a transportation path along which veneers are fed and transported,
- detector means for detecting the second veneer transported by the intermittent driving mechanism of the feeding means and outputting a detection signal when existence of the second veneer is detected;

adhesive reservoir means disposed at a position downstream the detector means in the predetermined feeding direction and apart from the transportation path for storing an adhesive, adhesive application means disposed at a position downstream the detector means in the predetermined feeding direction and having first and second adhesive-applying faces for applying the adhesive onto the rear scarf-cut face of the first veneer held at the first holding position and onto the front scarf-cut face of the second veneer held at the second holding position, reciprocating means mounted on the adhesive application means for reciprocating the adhesive application means between a first position where the adhesive application means is inserted into the adhesive reservoir means to take the adhesive on the first and the second adhesive-applying faces thereof, a second position where the first adhesive-applying face of the adhesive application means is pressed in a substantially parallel configuration against the rear scarf-cut face of the first veneer to apply the adhesive on the first adhesive-applying face to the rear scarf-cut face of the first veneer, which is held at the first holding position by the intermittent driving mechanism of the feeding means, a third position which is apart from the transportation path, and a fourth position where the second adhesive-applying face of the adhesive application means is pressed in a substantially parallel configuration against the front scarf-cut face of the second veneer to apply the adhesive on the second adhesive-applying face to the front scarf-cut face of the second veneer, which is held at the second holding position by the intermittent driving mechanism of the feeding means, and control means for receiving the detection signal output from the detector means, determining positions of the first veneer and the second veneer, and controlling operations of the intermittent driving mechanism of the feeding means and the reciprocating means based on the positions of the first veneer and the second veneer, the control means outputting a first adhesive application signal when the front scarf-cut face of the second veneer reaches the detector means and activating the reciprocating means to move the adhesive application means from the first position to the second position to apply the adhesive onto the rear scarf-cut face of the first veneer which is held at the first holding position, the control means outputting a stand-by signal when application of the adhesive onto the rear scarf-cut face of the first veneer is completed and activating the reciprocating means to move the adhesive application means from the second position to the third position, the control means outputting a second adhesive application signal when the front scarf-cut face of the second veneer reaches the second holding position and activating the reciprocating means to move the adhesive application means from the third position to the fourth position to apply the adhesive onto the front scarf-cut face of the second veneer.

The apparatus of the invention may be constructed to apply the adhesive either one of the rear scarf-cut face of the first veneer and the front scarf-cut face of the second veneer. The intermittent driving mechanism of the feeding means includes a first intermittent driving mechanism for transporting the first veneer and a second intermittent driving mechanism for transporting the second veneer.

In the former structure, the control means first outputs an adhesive application signal when the front scarf-cut face of the second veneer reaches the detector means, inactivates the second intermittent driving mechanism of the feeding means to stop transportation of the second veneer, and activates the reciprocating means to move the adhesive application means from the first position to the second position to apply the adhesive onto the rear scarf-cut face of the first veneer which is held at a predetermined holding position by the first intermittent driving mechanism of the feeding means. The control means then outputs an end-of-application signal when application of the adhesive onto the rear scarf-cut face of the first veneer is completed and re-activates the first and the second intermittent driving mechanisms of the feeding means to resume transportation of the first veneer and the second veneer in the predetermined feeding direction. The control means subsequently outputs a waiting signal when a rear end of the first veneer reaches a predetermined waiting position and inactivates the first intermittent driving mechanism of the feeding means to hold the rear end of the first veneer at the predetermined waiting position. The control means outputs a joint signal when a front end of the second veneer reaches the predetermined waiting position and inactivates the second intermittent driving mechanism of the feeding means to hold the front end of the second veneer at the predetermined waiting position.

In the latter structure, the control means first outputs a waiting signal when a rear end of the first veneer reaches a predetermined waiting position and inactivates the first intermittent driving mechanism of the feeding means to hold the rear end of the first veneer at the predetermined waiting position. The control means then outputs an adhesive application signal when the front scarf-cut face of the second veneer reaches a predetermined holding position, inactivates the second intermittent driving mechanism of the feeding means to hold the second veneer at the predetermined holding position, and activates the reciprocating means to move the adhesive application means from the first position to the second position to apply the adhesive onto the front scarf-cut face of the second veneer which is held at the predetermined holding position by the second intermittent driving mechanism of the feeding means. The control means subsequently outputs an end-of-application signal when application of the adhesive onto the front scarf-cut face of the second veneer is completed and re-activates the second intermittent driving mechanism of the feeding means to resume transportation of the second veneer in the predetermined feeding direction. The control means outputs a joint signal when a front end of the second veneer reaches the predetermined waiting position and inactivates the second intermittent driving mechanism of the feeding means to hold the front end of the second veneer at the predetermined waiting position.

In either of these structures, the apparatus further includes joint means for bringing the front scarf-cut face of the second veneer into contact with the rear scarf-cut face of the first veneer, and pressure means for applying a predetermined pressure onto the joint of the front scarf-cut face of the second veneer and the rear scarf-cut face of the first veneer to securely join the second veneer with the first veneer.

The invention is also directed to another adhesive-applying apparatus including:

feeding means having an intermittent driving mechanism for feeding and transporting a veneer in a normal feeding direction and a reverse feeding direction, which is opposite to the normal feeding direction, along fibers of the veneer, the feeding means forming a transportation path along which veneers are fed and transported;

detector means for detecting the veneer transported by the intermittent driving mechanism of the feeding means and outputting a detection signal when existence of the veneer is detected;

adhesive reservoir means disposed at a position downstream the detector means in the normal feeding direction and apart from the transportation path for storing an adhesive;

adhesive application means disposed at a position downstream the detector means in the normal feeding direction and having an adhesive-applying surface for applying the adhesive onto a scarf-cut face of the veneer transported by the intermittent driving mechanism of the feeding means;

reciprocating means mounted on the adhesive application means for reciprocating the adhesive application means between a first position where the adhesive application means is inserted into the adhesive reservoir means to take the adhesive on the adhesive-applying surface thereof and a second position where the adhesive-applying surface of the adhesive application means is held in a middle of the transportation path and substantially parallel to the scarf-cut face of the veneer to apply the adhesive on the adhesive-applying surface to the scarf-cut face of the veneer; and control means for receiving the detection signal output from the detector means, determining a position of the veneer, and controlling operations of the intermittent driving mechanism of the feeding means and the reciprocating means based on the position of the veneer, the control means activating the intermittent driving mechanism of the feeding means to transport the veneer in either the normal feeding direction or the reverse feeding direction while activating the reciprocating means to hold the adhesive application means in the middle of the transportation path to wait for approach of the veneer, so that the scarf-cut face of the veneer is pressed against the adhesive-applying surface of the adhesive application means in a substantially parallel configuration.

Any of the above apparatuses presses the adhesive-applying surface of the adhesive application member against the scarf-cut face of the veneer in a substantially parallel configuration, thus allowing a substantially fixed amount of adhesive to be applied onto the scarf-cut face of the veneer.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
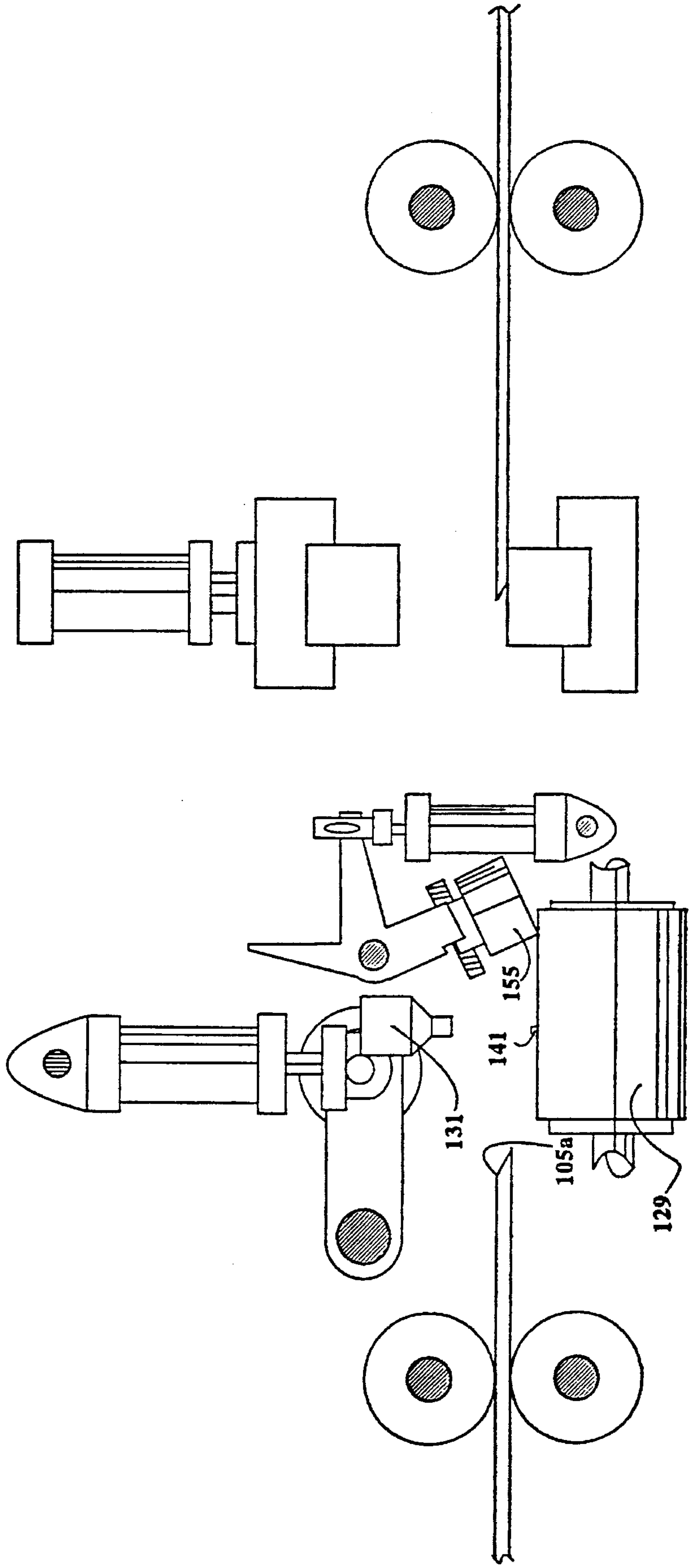
FIG. 1 is a side view illustrating an apparatus of the prior-art structure.
Figure 2:
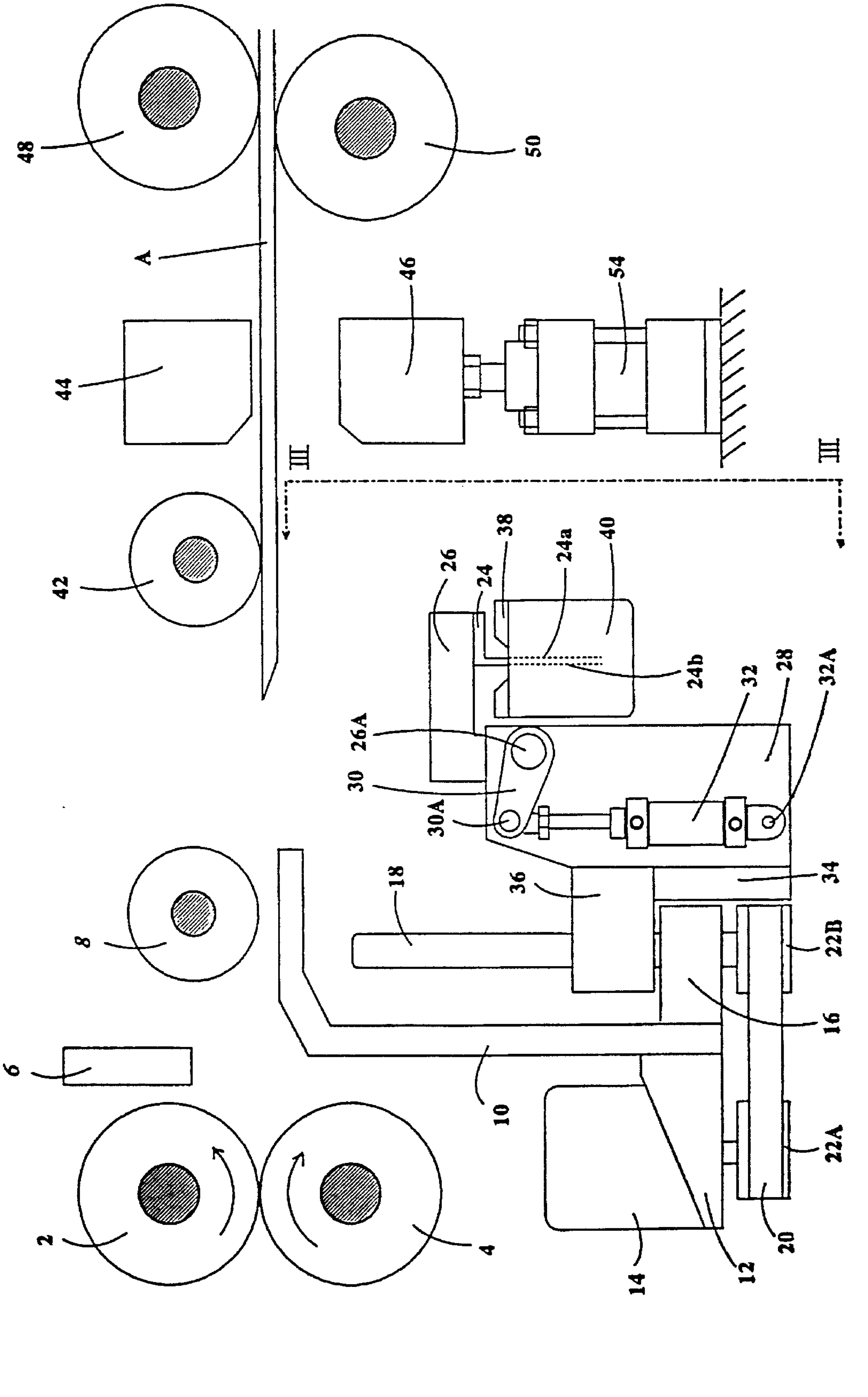
FIG. 2 is a side view schematically illustrating an apparatus for applying an adhesive onto scarf-cut faces of veneers as a first embodiment according to the invention.
Figure 3:
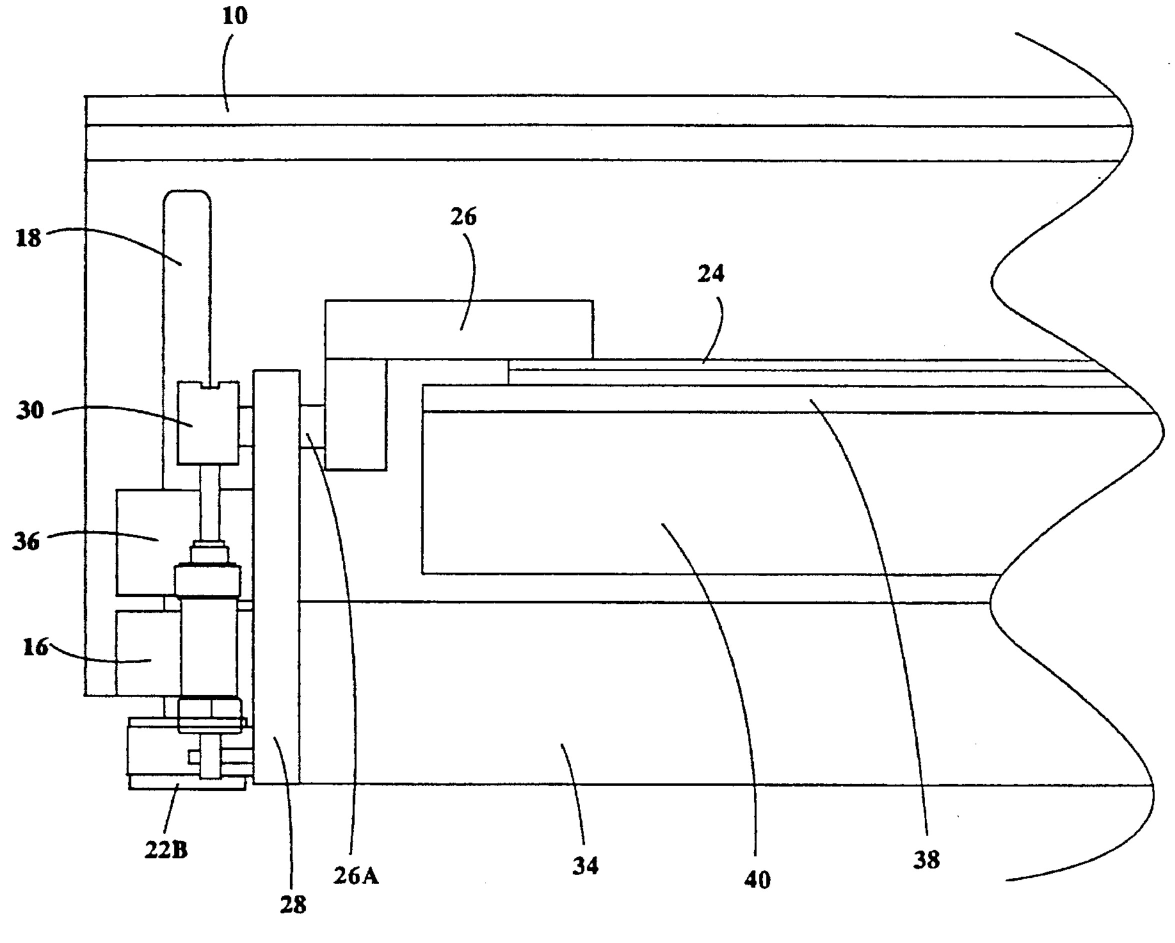
FIG. 3 is a cross sectional view taken on the line III—III of FIG. 2.
Figure 4:
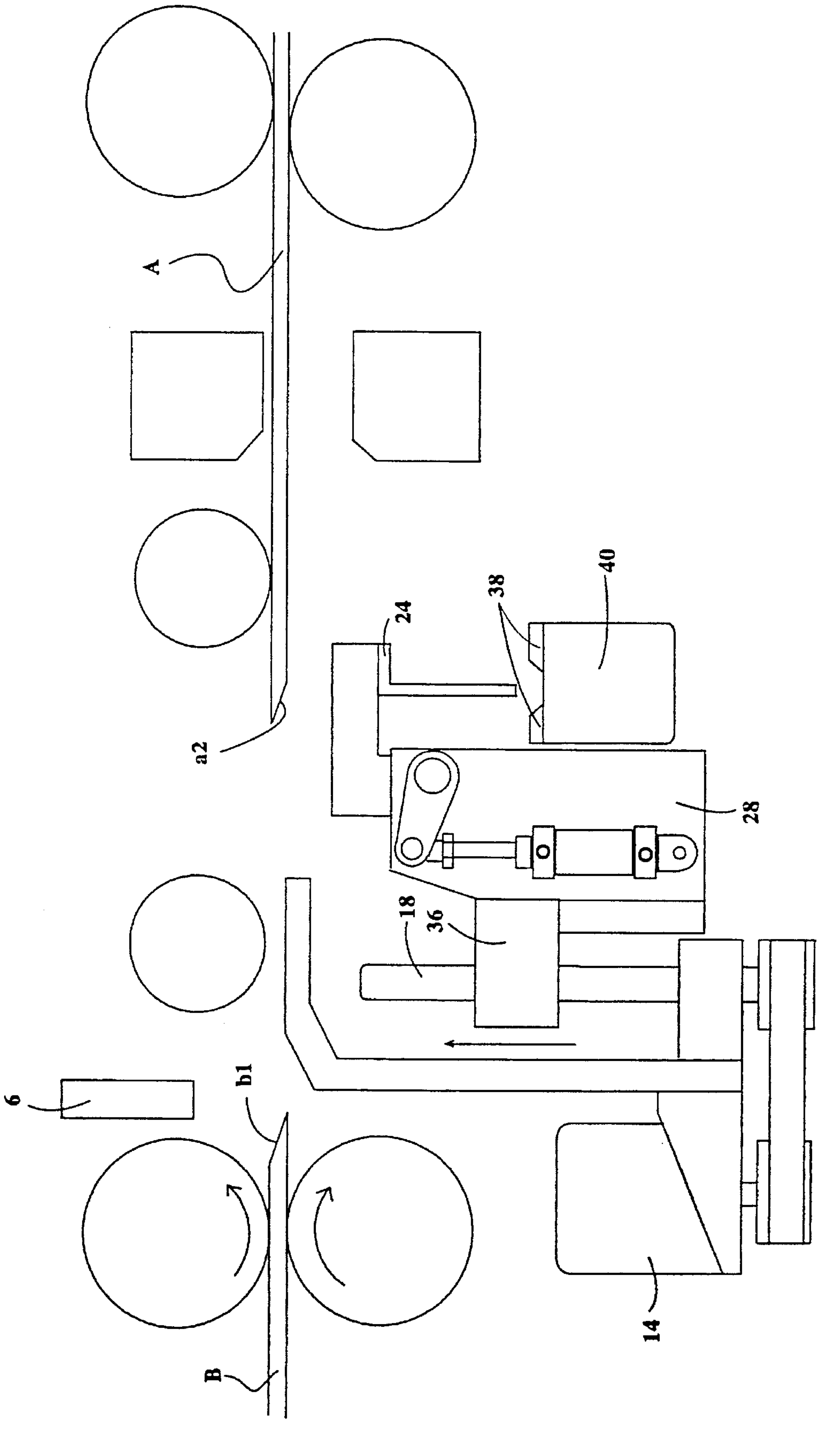
FIG. 4 shows operation of the apparatus in the embodiment.
Figure 5:
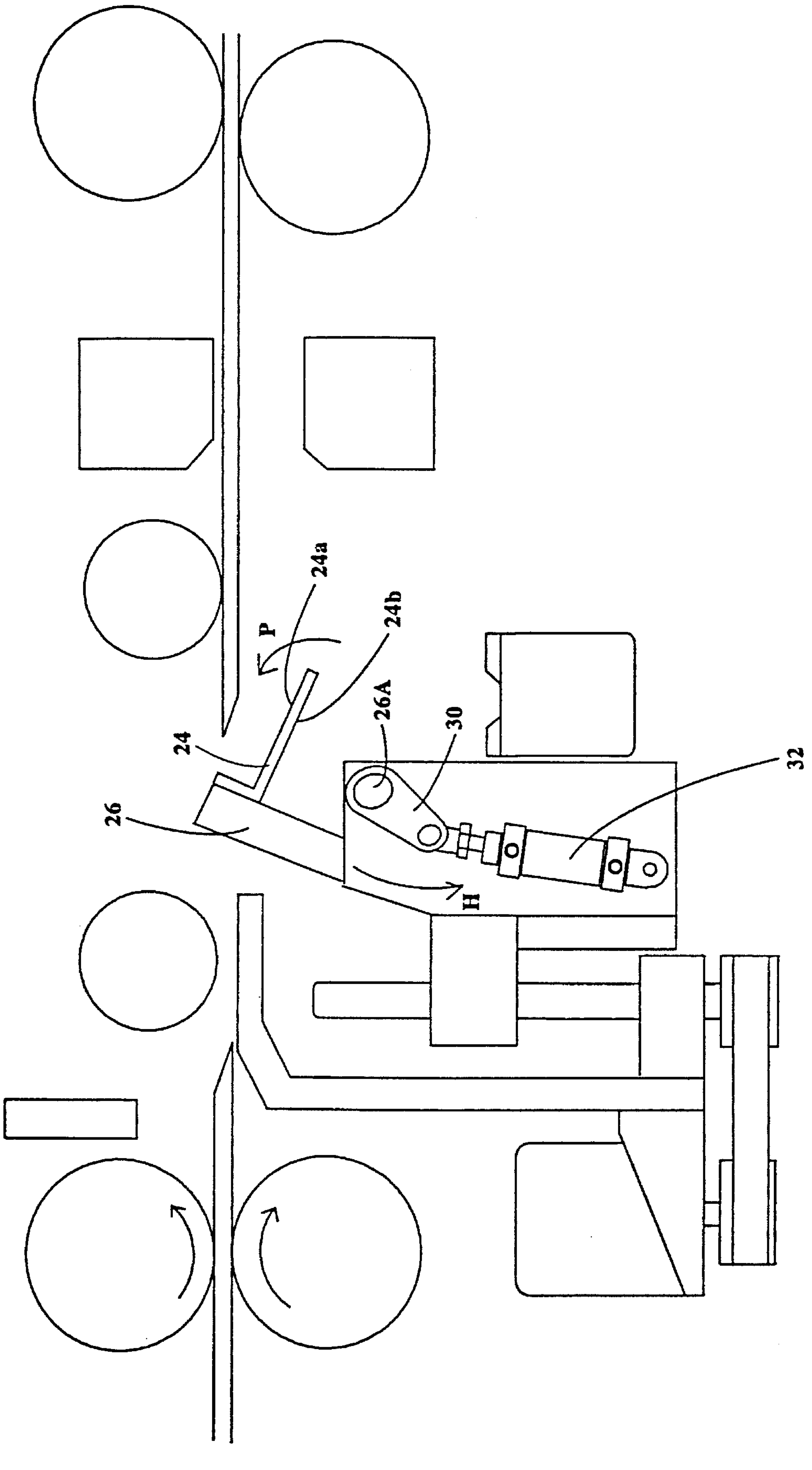
FIG. 5 also shows operation of the apparatus in the embodiment.
Figure 8:
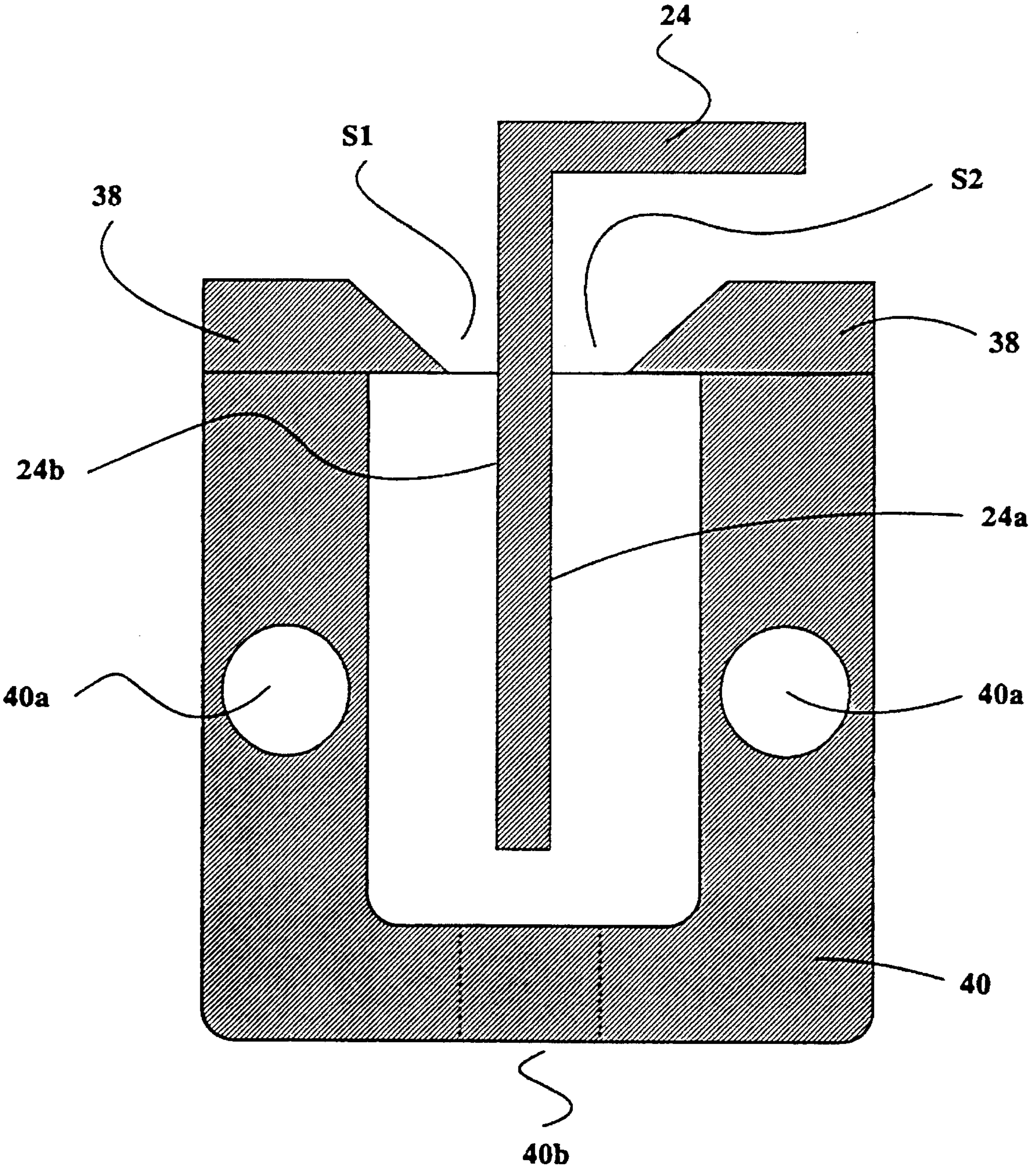
FIG. 8 is an enlarged view showing a typical structure of a space regulating mechanism.

A preferred embodiment according to the invention is described in detail based on the drawings. FIG. 2 is a side view schematically illustrating an apparatus for applying an adhesive onto a scarf-cut face of veneers as a first embodiment according to the invention. FIG. 3 is a cross sectional view taken on the line III—III of FIG. 2. FIGS. 4 and 5 show operation of the apparatus in the embodiment, and FIGS. 6A through 6F schematically show an adhesive application process in the embodiment. FIG. 8 is an enlarged view showing a typical structure of a space regulating mechanism.

With reference to FIG. 2, a plurality of feeding rolls 2 and 4 for feeding veneers have a length, in a direction perpendicular to a feeding direction of veneers, equal to or greater than the width of veneers. The upper feeding roll 2 and the lower feeding roll 4 are supported by a frame (not shown) of the apparatus to bring the circumferential faces of the rolls into contact with each other. A power-driven motor (not shown) functioning as an intermittent driving mechanism is connected to the lower feeding roll 4 via a clutch mechanism (not shown). Veneers are fed at appropriate intervals by the action of the clutch mechanism.

A plurality of detectors 6 for detecting existence of veneers and outputting detection signals are arranged in the direction perpendicular to the veneer-feeding direction and attached to the frame via an appropriate fixing element (not shown). Typical examples of the detectors 6 are phototubes and limit switches.

A pressure roll 8 descends and presses a veneer against the top face of a table 10 to hold a front end of the veneer at a fixed position. The pressure roll 8 has a length, in the direction perpendicular to the veneer-feeding direction, equal to or greater than the width of veneers. The pressure roll 8 is supported (not shown) to allow driven rotations and attached to the frame via a vertical reciprocating mechanism such as a cylinder (not shown).

An open-topped adhesive reservoir 40 having a length, in the direction perpendicular to the veneer-feeding direction, equal to or greater than the width of veneers stores a thermosetting adhesive, such as a urea resin adhesive or a phenol resin adhesive. Referring to FIG. 8, the adhesive reservoir 40 is provided with a temperature-regulating hole 40*a* which is formed in the side wall of the reservoir 40. Cooling water of approximately 13° C. is fed from a cooling water tank (not shown) and circulates through the temperature regulating hole 40*a* by a pump (not shown). The adhesive reservoir 40 also has an adhesive-supply aperture 40*b* formed in the bottom of the reservoir 40. The thermosetting adhesive is supplied from an adhesive tank (not shown) through the adhesive-supply aperture 40*b* into the adhesive reservoir 40 by means of a pump (not shown). A freely-adjustable space regulator plate 38 is mounted on the adhesive reservoir 40. The space regulator plate 38 freely moves in a radial direction of the open top of the adhesive reservoir 40 to set desirable dimensions of a reverse truncated cone-shaped opening on the center thereof. The opening defines a first space S1 and a second space S2 through which an adhesive application member 24 (described later) is inserted in and pulled out of the adhesive reservoir 40, so as to allow a substantially fixed amount of the thermosetting adhesive to be applied onto each adhesive-applying face (described below) of the adhesive application member 24.

The adhesive application member 24 has first and second adhesive-applying faces 24*a* and 24*b* as clearly shown in FIG. 5. The thermosetting adhesive adhering to the first and the second adhesive-applying faces 24*a* and 24*b* of the adhesive application member 24 are applied onto a rear scarf-cut face of a first veneer and a front scarf-cut face of a second veneer, which are successively fed by the plurality of feeding rolls 2 and 4. The adhesive application member 24 is an L-shaped plate having a length, in the direction perpendicular to a feeding direction of veneers, equal to or greater than the width of veneers. A short arm of the L-shaped adhesive application member 24 is fixed by a plurality of pivot mechanisms 26 each having a shaft 26A as shown in FIG. 3.

The shaft 26A of each pivot mechanism 26 is rotatably supported by a lifting member 28 and fixed to a pivot arm 30.

Each lifting member 28 is provided with a cylinder 32 and a female screw plate 36 working as a driving mechanism. The plurality of lifting members 28 are joined with each other via a joint plate 34 having a length, in the direction perpendicular to a feeding direction of veneers, equal to or greater than the width of veneers.

Referring to FIG. 2, a rod of the cylinder 32 is connected with the pivot arm 30 via a shaft 30A to allow pivotal movement of the cylinder 32 whereas a cylinder tube of the cylinder 32 is fixed to the lifting member 28 via a shaft 32A to allow pivotal movement of the cylinder 32.

A male screw bar 18 is fitted in each female screw plate 36 to allow vertical movement of the lifting member 28.

A lower part of each male screw bar 18 is rotatably supported by a base 16 and further engaged with a first toothed pulley 22B.

The table 10 fixed to the frame has a length, in the direction perpendicular to a feeding direction of veneers, equal to or greater than the width of veneers and is attached to a fixation base 12 and the plurality of bases 16.

A motor 14, which rotates in a normal direction and a reverse direction and is braked according to signals output from a controller (described later), is mounted on the fixation base 12 and has a shaft engaged with a second toothed pulley 22A. The plurality of first toothed pulleys 22B are connected with the first toothed pulley 22A via a toothed belt 20, so that rotation of the motor 14 is transmitted to rotate the respective male screw bars 18.

A positioning roll 42 for defining a vertical position of a rear end of each veneer has a length, in the direction perpendicular to a feeding direction of veneers, equal to or greater than the width of veneers and is rotatably attached to the frame.

A plurality of pressure members 44 and 46 having a length, in the direction perpendicular to a feeding direction of veneers, equal to or greater than the width of veneers are used for joining a rear scarf-cut face of a first veneer with a front scarf-cut face of a second veneer, which is transported after the first veneer, via the thermosetting adhesive applied onto the respective scarf-cut faces. The pressure members 44 and 46 respectively accommodate a heating medium (not shown) such as a heater or steam to heat the joint at the temperature of approximately 160 ° C. and cure the thermosetting adhesive on the scarf-cut faces. The upper pressure member 44 is fixed to the frame whereas the lower pressure member 46 is supported by a cylinder 54 to allow vertical movement of the lower pressure member 46.

A plurality of feed-out rolls 48 and 50 for feeding out veneers have a length, in the direction perpendicular to a feeding direction of veneers, equal to or greater than the width of veneers. The upper feed-out roll 48 and the lower feed-out roll 50 are supported by the frame (not shown) of the apparatus to bring the circumferential faces of the rolls into contact with each other. A power-driven motor (not shown) functioning as an intermittent driving mechanism, which rotates in a normal direction and a reverse direction according to signals output from the controller (described later), is connected to the lower feed-out roll 50 via a clutch mechanism (not shown). Veneers are fed at appropriate intervals by the action of the clutch mechanism.

The plurality of rolls 2, 4, 48, and 50 form a transportation path along which veneers are successively fed and transported.

The adhesive application member 24 is driven by the above pivot mechanisms 26 and the lifting member 28 to move between a first position where the adhesive application member 24 is inserted into the adhesive reservoir 40 to take the adhesive on the respective adhesive-applying faces 24*a* and 24*b* thereof, a second position where the first adhesive-applying face 24*a* of the adhesive application member 24 is pressed in a substantially parallel configuration against the rear scarf-cut face of the first veneer to apply the adhesive on the first adhesive-applying face 24*a* to the rear scarf-cut face of the first veneer, which is held at a first holding position (described below), a third position which is apart from the transportation path, and a fourth position where the second adhesive-applying face 24*b* of the adhesive application member 24 is pressed in a substantially parallel configuration against the front scarf-cut face of the second veneer to apply the adhesive on the second adhesive-applying face 24*b* to the front scarf-cut face of the second veneer, which is held at a second holding position (described below).

The apparatus further includes a controller (not shown) for controlling operations of the plurality of feeding rolls 2 and 4, the plurality of feed-out rolls 48 and 50, the pressure roll 8, the cylinder 32, the motor 14, and the cylinder 54 in response to the detection signals transmitted from the detectors 6. The controller measures the feeding distance of each veneer after output of detection signals from the detectors 6 using a rotary encoder (not shown). When the feeding distance becomes equal to one of preset values, the controller outputs corresponding one of operation signals and stop signals as described below. The controller has a delay circuit therein to output a subsequent operation signal with a certain delay after the output of a specific operation signal or stop signal so as to activate respective elements of the apparatus after a predetermined time period corresponding to the certain delay.

Actual operation of the apparatus thus constructed is described with the drawings. A first veneer A previously cut to have a rear scarf-cut face a2 is held by the plurality of feed-out rolls 48 and 50 at a first holding position as shown in FIG. 2. At the first holding position, the first adhesive-applying face 24*a* of the adhesive application member 24, which is vertically and pivotally moved to the second position by the pivot mechanisms 26 and the lifting member 28, is brought into contact with the rear scarf-cut face a2 of the first veneer A (see FIGS. 6A and 6B). While the respective elements of the apparatus are held at a stand-by position shown in FIG. 2, the controller outputs a second veneer feed signal to activate the plurality of feeding rolls 2 and 4, which start feeding a second veneer B previously cut to have a front scarf-cut face b1 and a rear scarf-cut face (not shown) along the fibers of the veneer B as illustrated in FIG. 4. When a front end of the second veneer B reaches a certain position below the detector 6 shown in FIG. 4, the detector 6 sends a first adhesive application signal to the controller.

The controller activates the motor 14 in response to the first adhesive application signal to rotate the plurality of male screw bars 18 in a normal direction. The rotation of the male screw bars 18 in the normal direction lifts the plurality of female screw plates 36 up to a predetermined position to take the adhesive application member 24, having the first and the second adhesive-applying faces 24*a* and 24*b* to which the thermosetting adhesive adheres, out of the adhesive reservoir 40.

The controller then outputs a pivot signal for contracting the rod of the cylinder 32 so as to rotate the pivot arm 30 in the direction of the arrow H (see FIG. 5). The rotation of the pivot arm 30 rotates the adhesive application member 24 in the direction of the arrow P to incline the adhesive application member 24 as shown in FIG. 5.

Figure 6A:
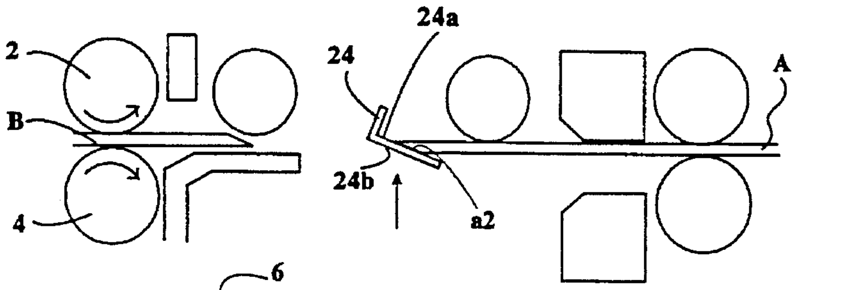
FIGS. 6A through 6F schematically show an adhesive application process in the embodiment.
Figure 6B:
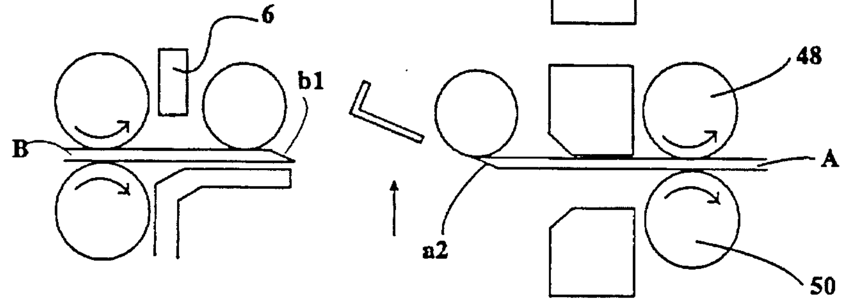

The motor 14 actuated in response to a lifting signal output from the controller rotates the male screw bars 18 in the normal direction, so that the adhesive application member 24 is lifted up to the second position where the adhesive application member 24 comes into contact with the rear scarf-cut face a2 of the first veneer A (see FIG. 6A). The thermosetting adhesive adhering to the first adhesive-applying face 24*a* of the adhesive application member 24 is accordingly applied onto the rear scarf-cut face a2 of the first veneer A held by the positioning roll 42. When the application of the adhesive onto the rear scarf-cut face a2 of the first veneer A is completed, the controller outputs a stand-by signal to drive the feed-out rolls 48 and 50 to transport the first veneer A (see FIG. 6B). When a rear end of the first veneer A reaches a predetermined waiting position (approximately in the middle of the pressure members 44 and 46 along the transportation path), the controller outputs a waiting signal to brake the feed-out rolls 48 and 50 and stop the first veneer A. After some time delay, the motor 14 rotates the male screw bars 18 in the normal direction to lift the adhesive application member 24 up to the third position.

Figure 6C:
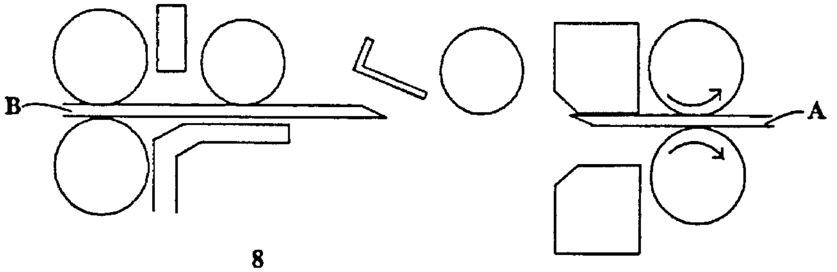
Figure 6D:
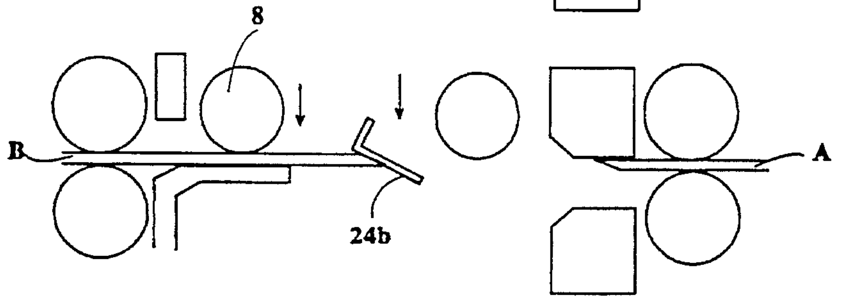

In the meantime, the second veneer B is further transported until the front scarf-cut face b1 of the second veneer B reaches a second holding position below the adhesive application member 24 held at the third position (see FIG. 6C). The controller then outputs a second adhesive application signal to brake the feeding rolls 2 and 4 and stop the second veneer B.

The controller subsequently outputs a first down signal to lower the pressure roll 8 (see FIG. 6D) to hold the second veneer B in between the pressure roll 8 and the table 10. After some time delay, reverse rotation of the motor 14 rotates the male screw bars 18 in the reverse or downward direction to position the second adhesive-applying face 24*b* of the adhesive application member 24 at the fourth position where the second adhesive-applying face 24*b* is brought into contact with the front scarf-cut face b1 of the second veneer B. The thermosetting adhesive adhering to the second adhesive-applying face 24*b* of the adhesive application member 24 is accordingly applied onto the front scarf-cut face b1 of the second veneer B.

Figure 6E:
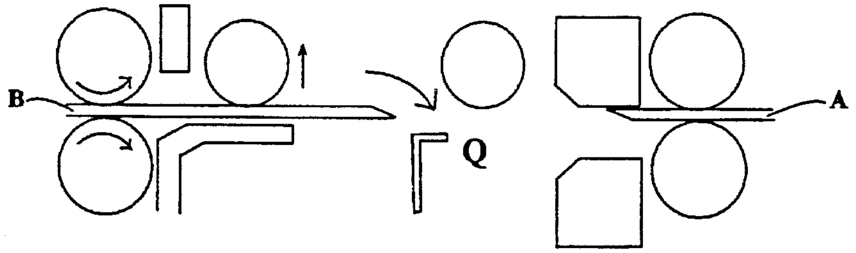
Figure 6F:
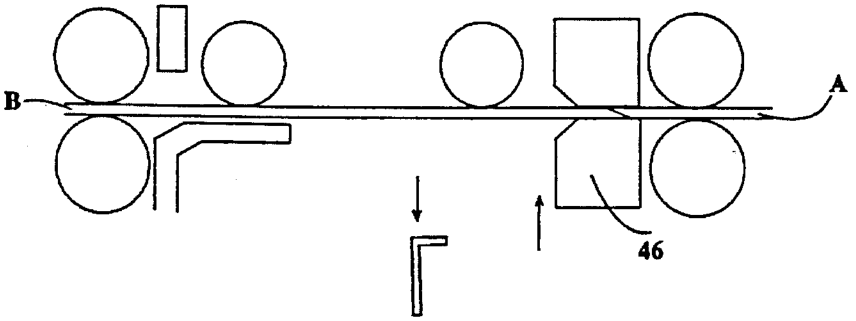

When the application of the adhesive onto the front scarf-cut face b1 of the second veneer B is completed, the controller outputs an end-of-application signal to expand the rod of the cylinder 32 and rotate the adhesive application member 24 in the direction of the arrow Q (see FIG. 6E). The illustrated long arm of the adhesive application member 24 is thus held in a downward orientation. After some time delay, the pressure roll 8 is lifted up and the feeding rolls 2 and 4 are driven to transport the second veneer B.

The controller outputs a second down signal to rotate the motor 14 in the reverse direction so as to rotate the male screw bars 18 in the reverse direction. The reverse rotation of the male screw bars 18 lowers the female screw plates 36 to move the adhesive application member 24 to the original first position where the adhesive application member 24 is inserted in the adhesive reservoir 40. When a front end of the second veneer B reaches the predetermined waiting position below the pressure member 44, the controller outputs a joint signal to brake the feeding rolls 2 and 4 and stop the second veneer B at the predetermined waiting position where the front scarf-cut face b1 of the second veneer B is aligned with the rear scarf-cut face a2 of the first veneer A. The cylinder 54 then lifts up to apply a fixed pressure and a certain heat to the joint of the front scarf-cut face b1 with the rear scarf-cut face a2 via the pressure members 44 and 46 for a time period set in a timer. The thermosetting adhesive applied onto the rear scarf-cut face a2 and the front scarf-cut face b1 is cured to securely join the rear scarf-cut face a2 of the first veneer A with the front scarf-cut face b1 of the second veneer B (see FIG. 6F).

After the joint is completed, the controller outputs a feed-out signal to drive the feeding rolls 2 and 4 and the feed-out rolls 48 and 50 to transport the first veneer A and the second veneer B joined with each other. When a rear end of the second veneer B reaches the certain position below the detector 6, the detector 6 outputs a rear end detection signal to the controller. When a rear scarf-cut face of the second veneer B reaches the first holding position of the first veneer A shown in FIG. 2, the controller outputs a stop signal to brake the feed-out rolls 48 and 50 and stop transportation of the first veneer A joined with the second veneer B.

Figure 7A:
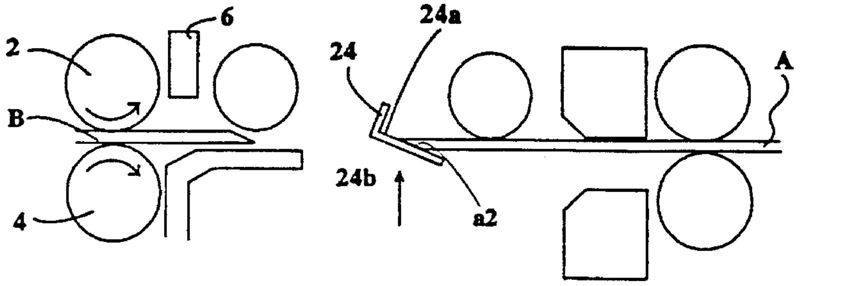
FIGS. 7A through 7C show modification of the adhesive application process.
Figure 7B:
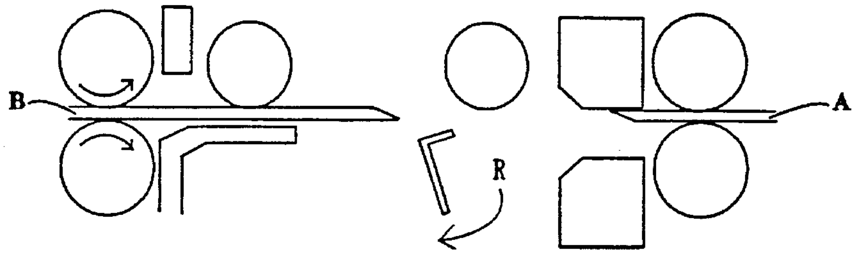
Figure 7C:
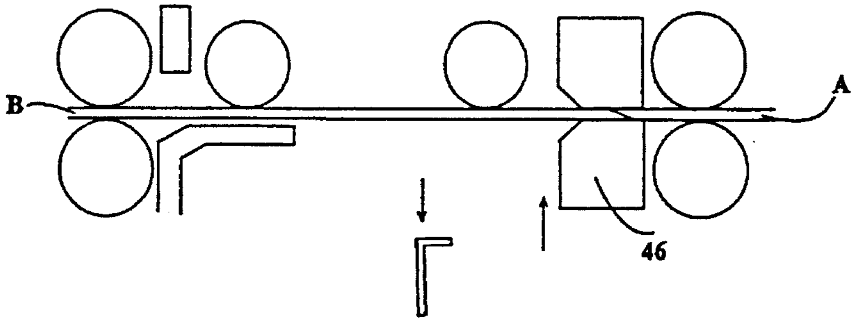

FIGS. 7A through 7C show a modified method of applying the adhesive only on the rear scarf-cut face a2 of the first veneer A. In this modified structure, the motor 14 rotates the male screw bars 18 in the normal direction like FIG. 6A, so that the adhesive application member 24 is lifted up to the second position where the adhesive application member 24 comes into contact with the rear scarf-cut face a2 of the first veneer A (see FIG. 7A). The thermosetting adhesive adhering to the first adhesive-applying face 24*a* of the adhesive application member 24 is accordingly applied onto the rear scarf-cut face a2 of the first veneer A held by the positioning roll 42. When the application of the adhesive onto the rear scarf-cut face a2 of the first veneer A is completed, the controller outputs an end-of-application signal to expand the rod of the cylinder 32 and rotate the adhesive application member 24 in the direction of the arrow R (see FIG. 7B). The long arm of the adhesive application member 24 is thus held in a downward orientation. After some time delay, the feeding rolls 2 and 4 are driven to transport the second veneer B.

The controller outputs a down signal to rotate the motor 14 in the reverse direction so as to rotate the male screw bars 18 in the reverse direction. The reverse rotation of the male screw bars 18 lowers the female screw plates 36 to move the adhesive application member 24 to the first position where the adhesive application member 24 is inserted in the adhesive reservoir 40. When a front end of the second veneer B reaches the predetermined waiting position below the pressure member 44, the controller outputs a joint signal to brake the feeding rolls 2 and 4 and stop the second veneer B at the predetermined waiting position where the front scarf-cut face b1 of the second veneer B is aligned with the rear scarf-cut face a2 of the first veneer A. The cylinder 54 then lifts up to apply a fixed pressure and a certain heat to the joint of the front scarf-cut face b1 with the rear scarf-cut face a2 via the pressure members 44 and 46 for a time period set in a timer. The thermosetting adhesive applied onto the rear scarf-cut face a2 is cured to securely join the rear scarf-cut face a2 of the first veneer A with the front scarf-cut face b1 of the second veneer B (see FIG. 7C). In the modified method, the adhesive application member 24 is moved only between the first position and the second position.

Although the adhesive is applied only on the rear scarf-cut face a2 of the first veneer A in this modification, the apparatus may be modified to apply the adhesive only on the front scarf-cut face b1 of the second veneer B.

In the above embodiment, the first adhesive-applying face 24*a* and the second adhesive-applying face 24*b* of the adhesive application member 24 are inclined to be pressed against the respective scarf-cut faces of veneers in a substantially parallel configuration. When a scarf-cut face is formed on one end of fibers of a veneer with a cutting tool, a relatively thin cut-end of the veneer may be curved in a direction opposite to the scarf-cut direction (upward in the first veneer A and downward in the second veneer in FIG. 4). Inclination of the first adhesive-applying face 24*a* and the second adhesive-applying face 24*b* to be substantially parallel to the respective scarf-cut faces makes it difficult to apply the adhesive onto the scarf-cut faces uniformly along the fibers of the veneer. In such a case, the adhesive application member 24 is rotated at a smaller angle than the above embodiment in the direction of the arrow P of FIG. 5, so that the space between the adhesive-applying face 24*a* or 24*b* and the corresponding scarf-cut face becomes narrower on the thin-cut end of the veneer. Vertical movement of the male screw plates 36 brings the adhesive-applying face 24*a* or 24*b* into contact first with the curved end of the veneer and then with the whole plane of the scarf-cut face by means of elasticity of the veneer. This ensures uniform application of the adhesive.

Figure 9A:
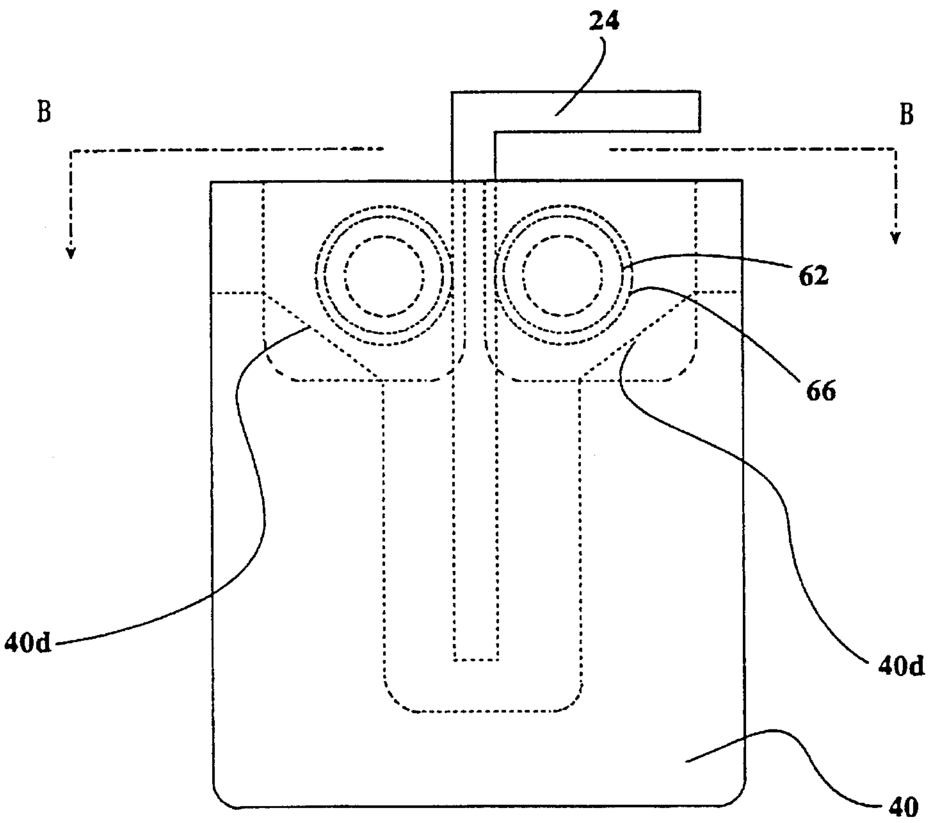
FIGS. 9A and 9B illustrate another structure of the space regulating mechanism.
Figure 9B:
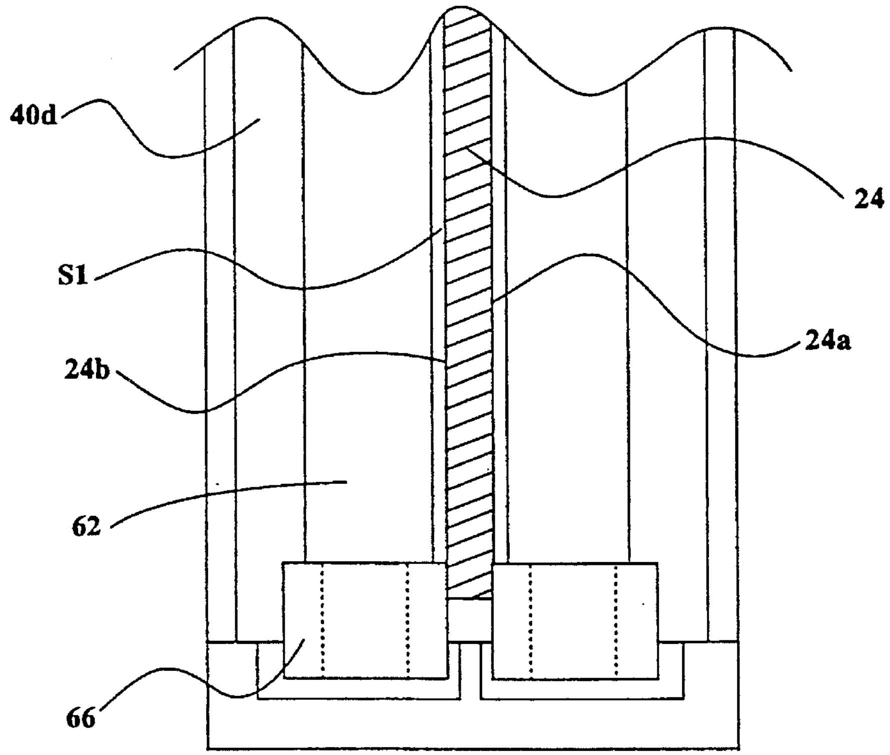

FIGS. 9A and 9B illustrate another structure of the space regulating mechanism for controlling the amount of the adhesive adhering to the first and the second adhesive-applying faces 24*a* and 24*b* of the adhesive application member 24, in which a space regulator roll 62 is used instead of the space regulator plate 38 of the above embodiment. FIG. 9B is a partially-omitted cross sectional view taken on the line B—B of FIG. 9A. A pair of larger-diametral rings 66 are mounted on both ends of the space regulator roll 62. The larger-diametral rings 66 roll over an inclined face 40*d* formed on an upper side of the adhesive reservoir 40 to come into contact with the adhesive application member 24 by the gravity. Since the diameter of the space regulator roll 62 is smaller than those of the rings 66, the space regulator roll 62 is held apart from the adhesive application member 24 by a fixed distance S1. This structure allows a substantially fixed amount of the adhesive to be applied onto the adhesive-applying face of the adhesive application member 24.

The amount of the adhesive is controlled with a variation in the distance S1 by replacing the rings 66 with rings having another diameter.

In the first embodiment, the adhesive application member 24 is vertically and pivotally moved to bring the first adhesive-applying face 24*a* and the second adhesive-applying face 24*b* into contact with the respective scarf-cut faces of the first and second veneers held at the preset positions. In an alternative structure, however, the first and the second adhesive-applying faces 24*a* and 24*b* of the adhesive application member 24 are previously held in a middle of the transportation path and substantially parallel to the scarf-cut faces of the veneers to apply the adhesive on the adhesive-applying faces 24*a* and 24*b* to the scarf-cut faces of the veneers.

Figure 10A:
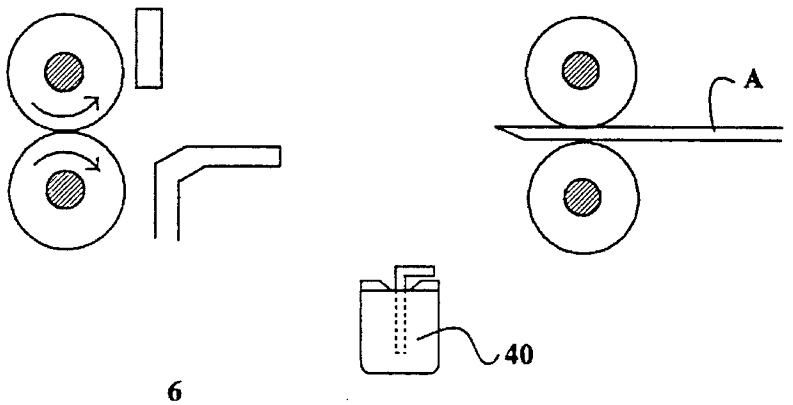
FIGS. 10A through 10D show operations of another adhesive-applying apparatus as a second embodiment according to the invention.
Figure 10B:
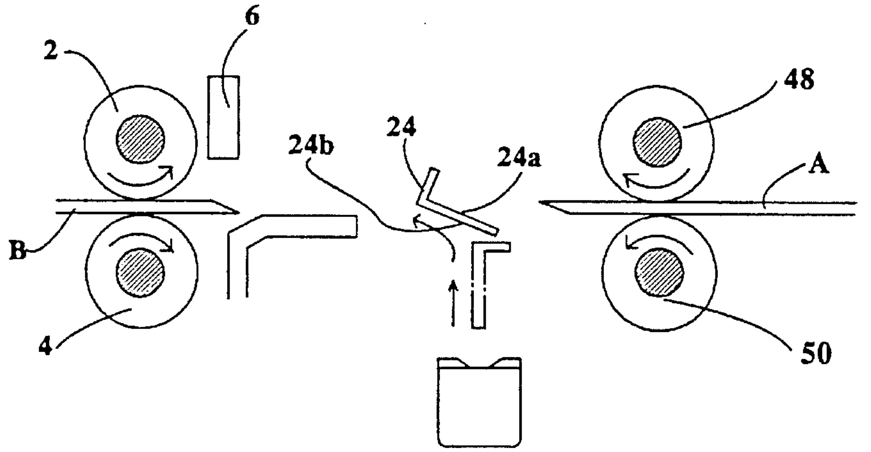
Figure 10C:
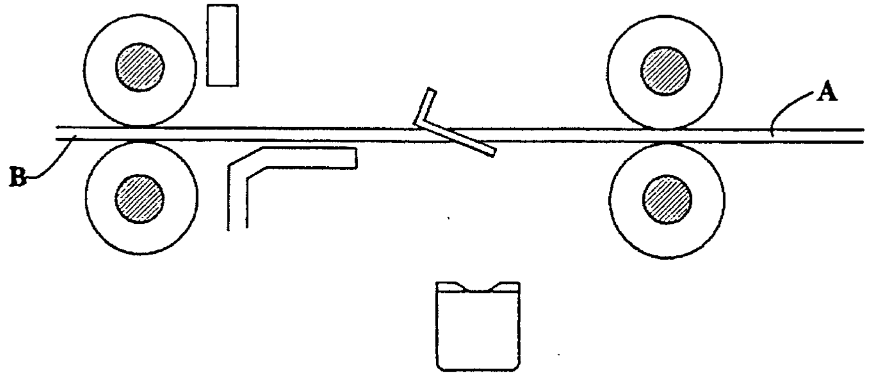
Figure 10D:
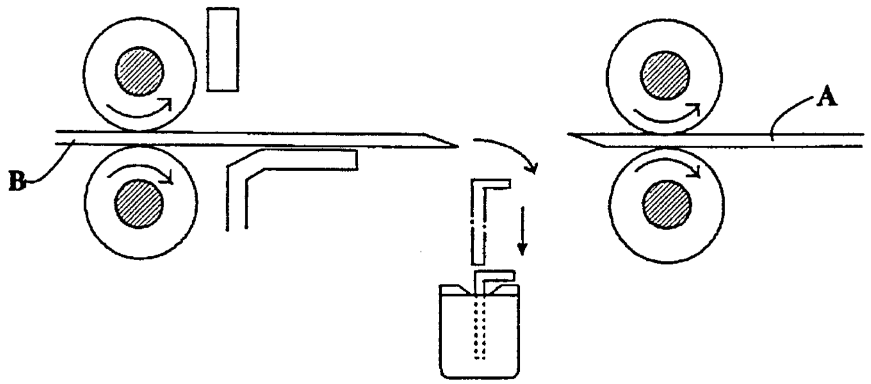

While the first veneer A is under the waiting condition shown in FIG. 10A, which corresponds to FIG. 2 of the first embodiment, the detector 6 detects existence of the second veneer B transported along the transportation path. The controller then outputs a wait signal to lift and rotate the adhesive application member 24, so that the first and the second adhesive-applying faces 24*a* and 24*b* of the adhesive application member 24 are held in a middle of the transportation path and substantially parallel to the scarf-cut faces of the first and second veneers A and B as illustrated in FIG. 10B. The controller subsequently outputs an adhesive application signal to drive the feed-out rolls 48 and 50 in the reverse direction shown by the arrows in FIG. 10B. The reverse rotation of the feed-out rolls 48 and 50 leads a backward movement of the first veneer A to a certain position shown in FIG. 10C where the rear scarf-cut face of the first veneer A comes into contact with the first adhesive-applying face 24*a*. In the meantime, the second veneer B is further transported to a certain position shown in FIG. 10C where the front scarf-cut face of the second veneer B comes into contact with the second adhesive-applying face 24*b*. The adhesive is accordingly applied onto both the rear scarf-cut face of the first veneer A and the front scarf-cut face of the second veneer B. The controller then outputs a feed-out signal to drive the feed-out rolls 48 and 50 in the normal direction as shown by the arrows in FIG. 10D. The first veneer A is transported forward with the normal rotation of the feed-out rolls 48 and 50. After some time delay, the adhesive application member 24 is rotated and lifted down to a position shown by the solid line and then to a position shown by the phantom line in FIG. 10D. The feeding rolls 2 and 4 are then rotated as shown by the arrows in FIG. 10D to transport the second veneer B forward and join the front scarf-cut face of the second veneer B securely with the rear scarf-cut face of the first veneer A.

Although the adhesive is applied onto both the rear scarf-cut face of the first veneer and the front scarf-cut face of the second veneer in this second embodiment, the adhesive may be applied to only one of the scarf-cut faces as long as sufficient adhesiveness is ensured.

Figure 11:
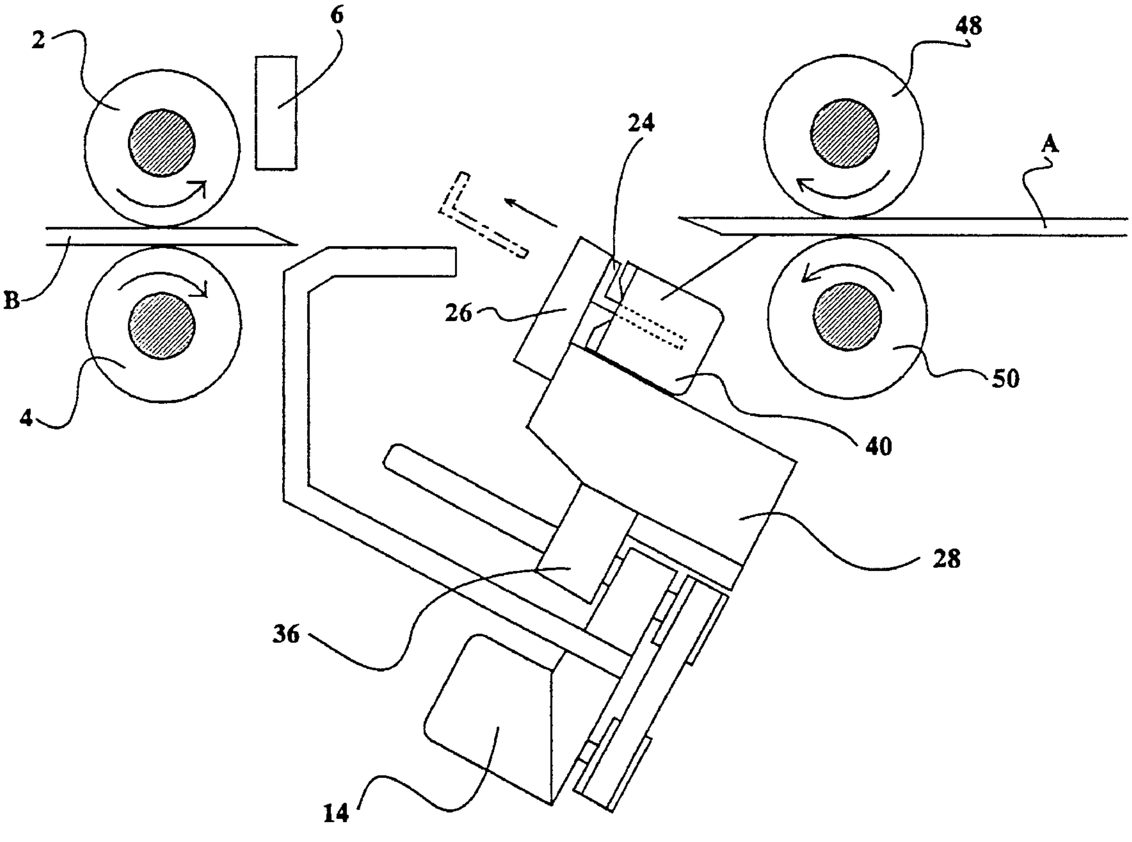
FIG. 11 is a side view showing still another adhesive-applying apparatus as a third embodiment according to the invention.

FIG. 11 is a side view showing still another adhesive-applying apparatus as a third embodiment according to the invention. In this embodiment, the adhesive application member 24 does not rotate but moves linearly from the first position in the adhesive reservoir 40 to the second position for applying the adhesive on the scarf-cut face of the veneer or vice versa. The supporting elements and the driving elements regarding the linear movement of the adhesive application member 24 are obliquely provided to hold the first and the second adhesive-applying faces 24*a* and 24*b* of the adhesive application member 24 in the adhesive reservoir 40 in parallel with the scarf-cut faces of the veneers. The structure of the third embodiment does not include the supporting elements and the driving elements regarding the pivotal movement of the adhesive application member 24 such as the cylinder 32 shown in FIG. 2. The motor 14 starts rotation to drive the female screw plates 36, thereby moving the adhesive application member 24 linearly between the first position and the second position. The motor 14 then stops to hold the adhesive application member 24 at a position shown by the one-dot chain line in FIG. 11. Application of the adhesive onto the scarf-cut face of the veneer is implemented in the same manner as above.

As described above, the structure of the invention allows the adhesive-applying face of the adhesive application member to be pressed in a substantially parallel configuration against the corresponding scarf-cut face of a veneer. A substantially fixed amount of adhesive is accordingly applied onto each scarf-cut face of the veneer.

There may be many modifications, alterations, and changes without departing from the scope or spirit of essential characteristics of the invention. It is thus clearly understood that the above embodiments are only illustrative and not restrictive in any sense. The scope and spirit of the present invention are limited only by the terms of the appended claims.

What is claimed is:

1. An apparatus for applying an adhesive onto a veneer having at least one scarf-cut face, said apparatus comprising feeding means having an intermittent driving mechanism for transporting a veneer in a predetermined feeding direction along fibers of the veneer and for stopping the transportation of the veneer to hold the veneer at a predetermined holding position, said feeding means forming a transportation path along which the veneer is transported, detector means for detecting a selected position of the veneer transported by the intermittent driving mechanism of said feeding means and for selectively outputting a detection signal when the veneer is detected at said selected position, adhesive reservoir means disposed at a position downstream of the detector means in said predetermined feeding direction and apart from said transportation path for storing an adhesive, adhesive application means disposed at a position downstream of the detector means in said predetermined feeding direction and having an adhesive-applying surface for applying the adhesive onto the scarf-cut face of the veneer transported and held at said predetermined holding position by the intermittent driving mechanism of said feeding means, reciprocating means coupled to said adhesive application means for reciprocatingly moving said adhesive application means between a first position where said adhesive application means is inserted into said adhesive reservoir means to dispose the adhesive on the adhesive-applying surface thereof and a second position where the adhesive-applying surface of said adhesive application means is disposed substantially parallel to and pressed against the scarf-cut face of the veneer to apply the adhesive on the adhesive-applying surface to said scarf-cut face of the veneer, said veneer being held at the predetermined holding position by the intermittent driving mechanism of said feeding means during application of said adhesive, and control means for controlling one of the intermittent driving mechanism of said feeding means and said reciprocating means in response to said detection signal.

2. An apparatus in accordance with claim 1, wherein said adhesive reservoir means includes an open top and a freely-adjustable space regulator means mounted on the open top of said adhesive reservoir means to define a space through which said adhesive application means is inserted and removed from said adhesive reservoir means, so that a substantially fixed amount of adhesive is disposed on the adhesive-applying surface of said adhesive application means.

3. An apparatus in accordance with claim 2, wherein said space regulator means comprises a freely-adjustable space regulator plate having a reverse truncated cone-shaped opening defining a space through which said adhesive application means is inserted and removed from said adhesive reservoir means, so as to allow a substantially fixed amount of adhesive to be applied onto the adhesive-applying surface of said adhesive application means.

4. An apparatus in accordance with claim 2, wherein said adhesive reservoir means has an inner surface with an inclined face and said space regulator means comprises a space regulator roll and a larger-diametral ring mounted on a circumference of a portion of said space regulator roll, said larger-diametral ring being adapted to move on said inclined face of said adhesive reservoir means to contact said adhesive application means when disposed within said reservoir means, said space regulator roll being spaced from said adhesive application means by a fixed distance so as to allow a substantially fixed amount of adhesive to be applied onto the adhesive-applying surface of said adhesive application means.

5. An apparatus in accordance with claim 2, wherein a veneer fed and transported by the intermittent driving mechanism of said feeding means has at least a rear scarf-cut face, the adhesive-applying surface of said adhesive application means being adapted to apply the adhesive onto the rear scarf-cut face of the veneer, and wherein said reciprocating means reciprocatingly moves said adhesive application means between a first position where said adhesive application means is inserted into said adhesive reservoir means to dispose the adhesive on the adhesive-applying surface thereof and a second position where the adhesive-applying surface of said adhesive application means is disposed substantially parallel to and pressed against the rear scarf-cut face of the veneer to apply the adhesive on the adhesive-applying surface to said rear scarf-cut face of the veneer when disposed in said holding position.

6. An apparatus in accordance with claim 2, wherein the veneer fed and transported by the intermittent driving mechanism of said feeding means has at least a front scarf-cut face, the adhesive-applying surface of said adhesive application means applying the adhesive onto the front scarf-cut face of the veneer, and wherein said reciprocating means reciprocatingly moves said adhesive application means between a first position where said adhesive application means is inserted into said adhesive reservoir means to dispose the adhesive on the adhesive-applying surface thereof and a second position where the adhesive-applying surface of said adhesive application means is disposed substantially parallel to and pressed against the front scarf-cut face of the veneer to apply the adhesive on the adhesive-applying surface to said front scarf-cut face of the veneer when disposed in said holding position.

7. An apparatus in accordance with claim 5 or 6, wherein said reciprocating means moves said adhesive application means to the second position where the adhesive-applying surface of said adhesive application means is brought into contact first with an end of the scarf-cut face of each veneer and then with a planar surface of the scarf-cut face.

8. An apparatus in accordance with claim 5, wherein the intermittent driving mechanism of said feeding means comprises a first intermittent driving mechanism for transporting a first veneer having at least a rear scarf-cut face and a second intermittent driving mechanism for transporting a second veneer having at least a front scarf-cut face, said control means outputting an adhesive application signal when the front scarf-cut face of said second veneer reaches the detector means, the second intermittent driving mechanism stopping transportation of said second veneer in response to said adhesive application signal, and said control means then activating said reciprocating means to move said adhesive application means from said first position to said second position to apply the adhesive onto the rear scarf-cut face of said first veneer which is held at a predetermined holding position by the first intermittent driving mechanism of said feeding means, said control means outputting an end-of-application signal when application of the adhesive onto the rear scarf-cut face of said first veneer is completed and reactivating the first and the second intermittent driving mechanisms of said feeding means to resume transportation of said first veneer and said second veneer in the predetermined feeding direction, said control means outputting a waiting signal when a rear end of said first veneer reaches a predetermined waiting position, said first intermittent driving mechanism of said feeding means holding the rear end of said first veneer at the predetermined waiting position in response to said waiting signal, said control means outputting a joint signal when a front end of said second veneer reaches the predetermined waiting position, said second intermittent driving mechanism of said feeding means holding the front end of said second veneer at the predetermined waiting position in response to said joint signal, said apparatus further comprising joint means for bringing the front scarf-cut face of said second veneer into contact with the adhesive-applied rear scarf-cut face of said first veneer, and pressure means for applying a predetermined pressure onto the joint of the front scarf-cut face of said second veneer and the rear scarf-cut face of said first veneer to securely join said second veneer with said first veneer.

9. An apparatus in accordance with claim 6, wherein the intermittent driving mechanism of said feeding means comprises a first intermittent driving mechanism for transporting a first veneer having at least a rear scarf-cut face and a second intermittent driving mechanism for transporting a second veneer having at least a front scarf-cut face, said control means outputting a waiting signal when a rear end of said first veneer reaches a predetermined waiting position, said first intermittent driving mechanism of said feeding means holding the rear end of said first veneer at the predetermined waiting position in response to said waiting signal, said control means outputting an adhesive application signal when the front scarf-cut face of said second veneer reaches a predetermined holding position, the second intermittent driving mechanism of said feeding means holding said second veneer at the predetermined holding position, and said control means then activating said reciprocating means to move said adhesive application means from said first position to said second position to apply the adhesive onto the front scarf-cut face of said second veneer held at the predetermined holding position by the second intermittent driving mechanism of said feeding means, said control means outputting an end-of application signal when application of the adhesive onto the front scarf-cut face of said second veneer is completed and reactivating the second intermittent driving mechanism of said feeding means to resume transportation of said second veneer in the predetermined feeding direction, said control means outputting a joint signal when a front end of said second veneer reaches the predetermined waiting position and the second intermittent driving mechanism of said feeding means holding the front end of said second veneer at the predetermined waiting position in response to said joint signal, said apparatus further comprising joint means for bringing the adhesive-applied from scarf-cut face of said second veneer into contact with the rear scarf-cut face of said first veneer, and pressure means for applying a predetermined pressure onto the joint of the front scarf-cut of said second veneer and the rear scarf-cut face of said first veneer to securely join said second veneer with said first veneer.

10. An apparatus for applying an adhesive onto veneers each having at least one scarf-cut face, said apparatus comprising feeding means having an intermittent driving mechanism for successively transporting a first veneer and a second veneer in a predetermined feeding direction wherein said first veneer has at least a rear scarf-cut face and said second veneer has at least a front scarf-cut face, said intermittent driving mechanism being adapted to hold the rear scarf-cut face of the first veneer at a first holding position and the front scarf-cut face of the second veneer at a second holding position, said feeding means forming a transportation path along which said first and second veneers are transported, detector means for detecting a selected position of the second veneer transported by the intermittent driving mechanism of said feeding means and for outputting a detection signal when the second veneer is detected at said selected position;

adhesive reservoir means disposed at a position downstream of the detector means in said predetermined feeding direction and apart from said transportation path for storing an adhesive, adhesive application means disposed at a position downstream of the detector means in said predetermined feeding direction and having first and second adhesive-applying faces for applying the adhesive onto the rear scarf-cut face of said first veneer when held at said first holding position and onto the front scarf-cut face of said second veneer when held at said second holding position, reciprocating means coupled to said adhesive application means for reciprocatingly moving said adhesive application means between a first position where said adhesive application means is inserted into said adhesive reservoir means to dispose the adhesive on the first and second adhesive-applying faces thereof, a second position where the first adhesive-applying face of said adhesive application means is disposed substantially parallel to and pressed against the rear scarf-cut face of said first veneer to apply the adhesive on the first adhesive-applying face to said rear scarf-cut face of said first veneer, which is held at said first holding position by the intermittent driving mechanism of said feeding means, a third position which is spaced from said transportation path, and a fourth position where the second adhesive-applying face of said adhesive application means is disposed substantially parallel to and pressed against the front scarf-cut face of said second veneer to apply the adhesive on the second adhesive-applying face to said front scarf-cut face of said second veneer, which is held at said second holding position by the intermittent driving mechanism of said feeding means, and control means responsive to the detection signal output from said detector means for determining the selected positions of the first veneer and the second veneer, and for controlling one of the intermittent driving mechanism of said feeding means and said reciprocating means based on the positions of the first veneer and the second veneer, said control means outputting a first adhesive application signal when the front scarf-cut face of said second veneer reaches said detector means and activating said reciprocating means to move said adhesive application means from the first position to the second position to apply the adhesive onto the rear scarf-cut face of the first veneer which is held at the first holding position, said control means outputting a stand-by signal when application of the adhesive onto the rear scarf-cut face of said first veneer is completed and activating said reciprocating means to move said adhesive application means from the second position to the third position, said control means outputting a second adhesive application signal when the front scarf-cut face of said second veneer reaches the second holding position and activating said reciprocating means to move said adhesive application means from the third position to the fourth position to apply the adhesive onto the front scarf-cut face of the second veneer.

11. An apparatus in accordance with claim 10, wherein said adhesive reservoir means includes an open top and a space regulator means moumed on the open top of said adhesive reservoir means to define a space through which said adhesive application means is inserted and removed from said adhesive reservoir means, so that a substantially fixed amount of adhesive is disposed on each of said first and second adhesive-applying faces of said adhesive application means.

12. An apparatus for applying an adhesive onto a veneer having at least one scarf-cut face, said apparatus comprising feeding means having an intermittent driving mechanism for transporting the veneer in a normal feeding direction and a reverse feeding direction, which is opposite to said normal feeding direction, said feeding means forming a transportation path along which veneers are transported, detector means for detecting the veneer transported by the intermittent driving mechanism of said feeding means and for selectively outputting a detection signal when existence of the veneer is detected at a selected position, adhesive reservoir means disposed at a position downstream of the detector means in said normal feeding direction and apart from said transportation path for storing an adhesive, adhesive application means disposed at a position downstream of the detector means in said normal feeding direction and having an adhesive-applying surface for applying the adhesive onto a scarf-cut face of the veneer transported by the intermittent driving mechanism of said feeding means, reciprocating means mounted on said adhesive application means for reciprocatingly moving said adhesive application means between a first position where said adhesive application means is inserted into said adhesive reservoir means to dispose the adhesive on the adhesive-applying surface thereof and a second position where the adhesive-applying surface of said adhesive application means is held in said transportation path and substantially parallel to the scarf-cut face of the veneer to apply the adhesive on the adhesive-applying surface to said scarf-cut face of the veneer, and control means for receiving the detection signal output from said detector means, determining a position of the veneer, and controlling one of the intermittent driving mechanism of said feeding means and said reciprocating means based on the position of the veneer, said control means selectively activating the intermittent driving mechanism of said feeding means to transport the veneer in either the normal feeding direction or the reverse feeding direction while selectively activating said reciprocating means to dispose said adhesive application means in said transportation path, so that the scarf-cut face of the veneer is disposed in a substantially parallel configuration and then pressed against the adhesive-applying surface of said adhesive application means.

13. An apparatus in accordance with claim 12, wherein said adhesive reservoir means including an open top and a space regulator means mounted on the open top of said adhesive reservoir means to define a space through which said adhesive application means is inserted and removed from said adhesive reservoir means, so that a substantially fixed amount of adhesive is disposed on the adhesive-applying surface of said adhesive application means.

* * * * *